(No Model.) 2 Sheets—Sheet 1.

W. H. WILCOX.
FILTER.

No. 598,191. Patented Feb. 1, 1898.

Attest:
Frank H. Haskins.

Inventor:
W. H. Wilcox,
by Carr & Carr, Attys.

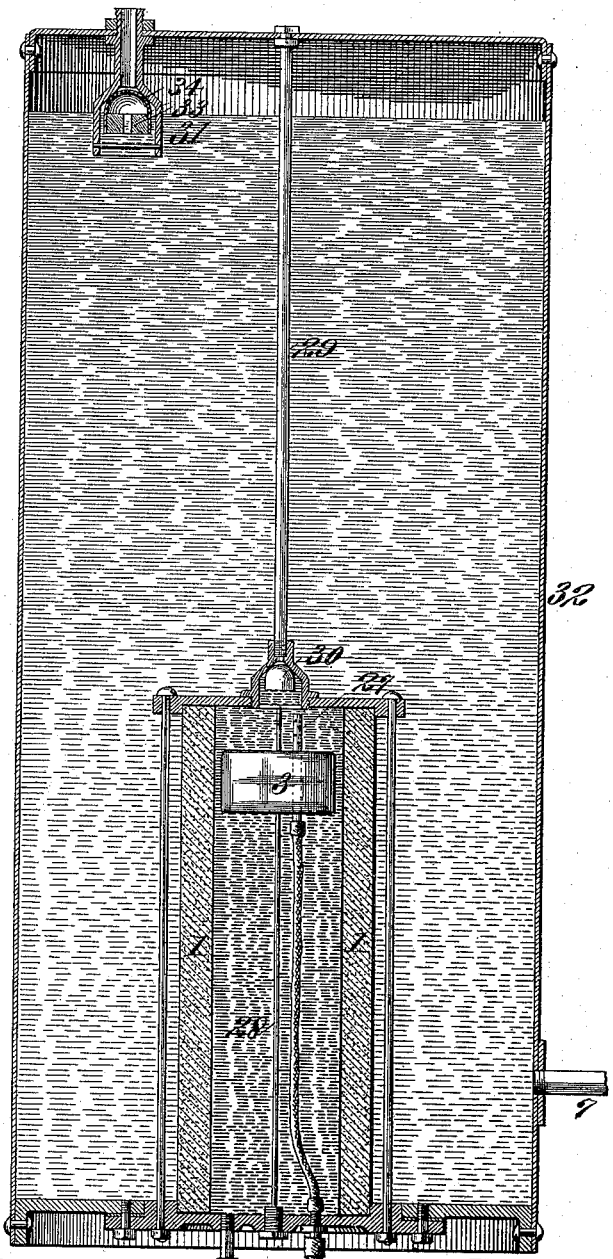

UNITED STATES PATENT OFFICE.

WALTER H. WILCOX, OF ST. LOUIS, MISSOURI.

FILTER.

SPECIFICATION forming part of Letters Patent No. 598,191, dated February 1, 1898.

Application filed August 23, 1897. Serial No. 649,195. (No model.)

*To all whom it may concern:*

Be it known that I, WALTER H. WILCOX, a citizen of the United States, residing in the city of St. Louis, State of Missouri, have invented a new and useful Improvement in Filters, of which the following is a specification.

My invention relates to filters, and has for its principal objects to prevent the filtering medium from fouling and to improve the operation.

It consists in a cleaning device, and particularly in a washing device carried by a float and arranged to automatically clean the surface of the filtering medium periodically.

It also consists in means for controlling the operation of the float.

It also consists in details and in improvements in construction, hereinafter described and claimed.

Figure 1:
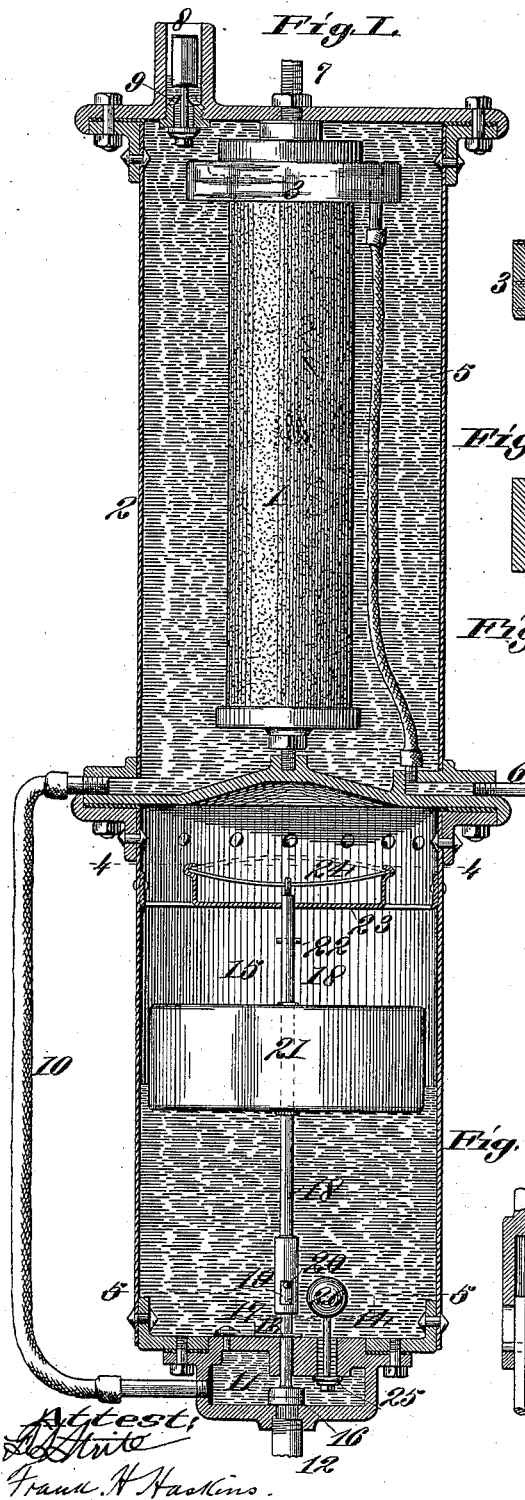
Figure 2:
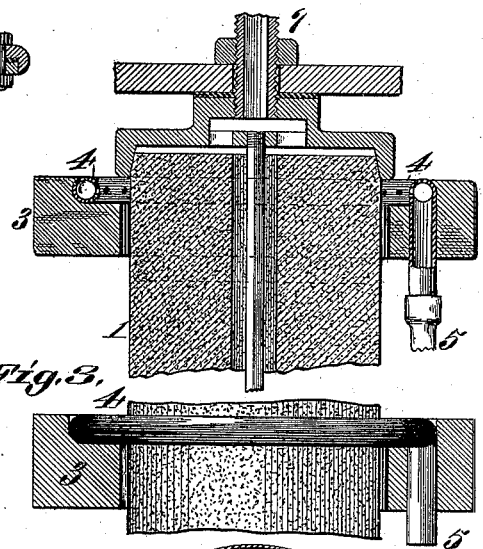
Figure 3:
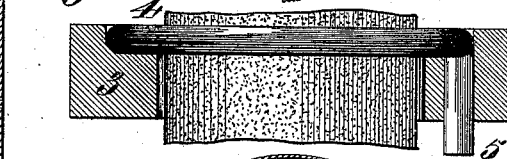
Figure 4:
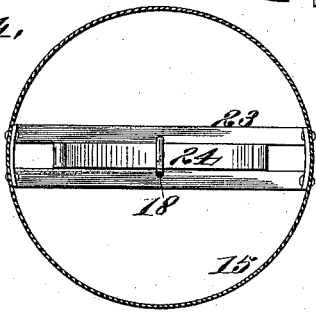
Figures 5, 6:
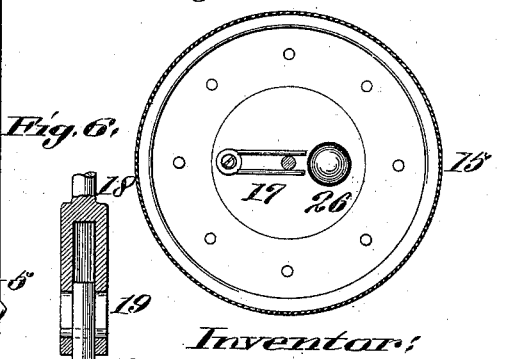

In the accompanying drawings, which form part of this specification, Figure 1 is a vertical section of a filter embodying my invention. Fig. 2 is a fragmental section of the upper portion of the filter-stone and castings and of the cleaning device. Fig. 3 is a fragmental side view of the filter-stone and spray-pipe with the float shown in section. Figs. 4 and 5 are horizontal sections on the lines 4 4 and 5 5, respectively, of Fig. 1. Fig. 6 is a sectional detail showing the lost-motion connection of the valve-stem, and Fig. 7 is a vertical section of a modified form wherein the water percolates through the stone from the hollow interior thereof.

Like symbols refer to like parts wherever they occur.

In the construction shown in Fig. 1 the filtering medium consists of a hollow cylindrical porous stone 1, arranged in an upright position inside of a tank 2. Loosely encircling this stone is an annular float 3, of cork, waterproofed wood, or other suitable material. Mounted on the upper portion of this float to move therewith is an annular tube or chamber 4, of hard rubber or other suitable material. This chamber is arranged close to the surface of the stone and is provided on the inside with a series of small perforations. A flexible tube 5, of soft rubber or other suitable material, connects the annular chamber to the water-supply pipe 6, which extends into the tank.

The outlet for the filtered water is through a pipe 7, extending through the shell of the tank and communicating with the hollow interior of the stone. In the top of the tank is an air-vent 8, controlled by a valve 9. A suitable valve consists of a float incased in a cage and having the valve proper suspended therefrom by a rod extending below the valve-seat. When the water rises in the cage, it raises the float and the float lifts the valve against its seat.

The lowermost portion of the tank has a flushing-pipe 10 communicating therewith. The other end of this pipe 10 opens into a chamber 11, having a waste-pipe 12 connected to its bottom and having two openings 13 14 in its top, both communicating with a tank 15. Inside of the chamber 11 is a reciprocating valve 16, adapted to close the waste-pipe 12, and the stem of this valve extends upwardly through the opening 13 into the tank 15. The stem does not fit the opening water-tight, but allows the water to leak slowly past it. A light spring rod or fork 17 binds the sides of the stem sufficiently tight to hold it in its raised position, but not tight enough to interfere with its operation, by means of the float, as hereinafter described. Centrally located inside of said tank 15 is a rod 18, having a socket in its power end and a slot 19 in its side communicating with said socket. The stem of valve 16 extends loosely into the socket of this rod 18 and with a pin 20, extending through said slot, forms a lost-motion connection of the valve-stem to the rod. Inside of said tank 15 and with the rod 18 extending freely through it is a float 21, arranged to strike against shoulders or tappets 22, provided therefor on the rod above and below said float. The upper end of the rod is connected to a snap-action spring device arranged in the upper part of the tank. A suitable spring device consists of a stiff plate 23, mounted in the upper portion of the tank and having upturned end portions. A straight flat piece 24 of spring metal of a length exceeding the distance between such upturned ends is mounted thereon between them, so that they exert endwise stress on said flat piece and thereby, when the flat piece is flexed slightly either upwardly or downwardly, tend to increase the flexure thereof.

Inside of the chamber 11 is a valve 25, adapted to close the opening 14 and connected to a float 26 in the lower portion of the tank 15, whereby the valve is seated and the opening 14 is closed as long as the water-level is above the lower portion of the tank.

The operation of the device is as follows: The water flows through the supply-pipe, the flexible tube, and the annular pipe surrounding the filter-stone, from which annular pipe it squirts against the stone and accumulates in the tank 2. As the water rises the float and the annular pipe thereon and the flexible tube connected to the annular pipe rise with the water and the air displaced by the water escapes through the air-vent. This operation continues rapidly until the water reaches the float of the air-vent, whereupon said vent is closed. Then the water in the tank percolates through to the hollow interior of the porous stone, and the water thus filtered and clarified passes through the outlet-pipe to its destination. During the foregoing operation a portion of the water from the filter-tank 2 flows through the flushing-pipe into the chamber 11 and thence into the controller-tank 15. The first effect of the inflow of water into the controller-tank 15 is to raise the float 26, and thereby lift the valve 25 against its seat, so as to close the opening 14. After the valve 25 is seated the only open communication between the chamber 11 and the controller-tank 15 is the very narrow space between the sides of the opening 13 and the valve-stem therein. The leakage of the water through this space is slight, and therefore the filling of the controller-tank is slow. As the water rises the float 21 rises with it without affecting any other parts until the float bears against the upper tappet of the rod 18. Then it lifts said rod against the force of the spring device 23 24 until the flexure of the spring 24 is reversed, and then the whole strength of the spring device, which hitherto by holding the float down has increased its buoyancy, is exerted as a snap action coöperating with said float to jerk the rod upward. The length of the slot in said rod is such that the play of the pin from end to end thereof is about equal to the movement of the middle of the spring from its extreme flexed position to the point of reversal of the flexure, so that the valve 16 is not affected by the movement of the float until it is lifted quickly by the float coöperating with the snap-action spring device 23 24, operating through the rod 18. The valve 16 is held in this raised position by means of the binding-fork 17 until forced down by the weight of the float after the water has run out of the tank. The rising of the valve 16 opens the waste-pipe 12, whereupon the water in the filter-tank 2 runs down by way of the flushing-pipe 10, and the water in the controller-tank 15 runs out through the opening 14, the back pressure of the water on the valve 25 being more than sufficient to overcome the buoyancy of the float. The outflow of water from the filter-tank continues until the controller-tank 15 is practically empty—that is, until the float 21 falls low enough to close the valve 16. The closing of the valve is effected in this manner: As the water-level falls the weight of the float bears on the shoulder of the rod 18, pulling said rod downwardly against the snap-action spring device 23 24 until the flexure thereof is reversed, whereupon the rod is pushed suddenly down. On account of the lost-motion connection of the rod and valve-stem the valve is not moved until the spring device acts, and then it is moved quickly to its seat and closes the waste-pipe 12. During the whole time the valve 16 is open the water flows out of the filter-tank faster than it enters, the air-vent therein providing atmospheric pressure for the purpose. As the float falls with the level of the water the water from the supply-pipe squirts from the perforations in the annular pipe against the stone and washes off the deposit thereon. The backflow of the filtered water inside of said stone coöperates in cleansing the stone by loosening the surface deposit. When the valve 16 closes, the filter-tank again begins to fill, and the operation is repeated periodically.

Fig. 7 indicates a modified form of my device wherein the water is supplied to the interior of the filter-stone 1 and the flushing-pipe 10 likewise communicates with the interior of the stone. Instead of an annular pipe the float in the filter-tank carries a pipe 27, projecting above it and having small radial perforations on all sides. An upright rod or stem 28, centrally located in the filter-tank, serves as a guide for the float. As the interior of the stone constitutes the filter-chamber in this construction and atmospheric pressure is required to fill and empty it quickly, an air-tube 29 extends from the top portion thereof to the open air. This air-vent is controlled by a valve 30 similar to the air-vent 31 for the filtered-water tank 32. These valves each consist of a perforated buoyant disk 33 and a hemispherical piece 34 of soft rubber or other flexible air-tight material fastened thereon. The tube which communicates with the air has its inner end arranged vertically and enlarged into a conical chamber having an open-work bottom. The disk is located inside of this cage and operates as follows: Normally the disk rests on the bottom; but when the water rises the disk is floated and bears the rubber hemisphere against the conical seat and thereby closes the air-vent. As the interior of the hemisphere is in open communication with the filter-tank the air inside thereof is compressed by the pressure of the water and reacts to expand the soft rubber into any uneven places in the valve-seat, thus insuring a better operation of the valve. As shown in Fig. 7, it is desirable to have the air-vent of the filtered-water tank extend some distance below the top thereof, whereby a volume of air is confined therein to form an air-cushion for increasing the outflow of water, this arrangement being equally desirable whether the filtered-water tank contains the filter-stone or is entirely separate.

My invention is obviously susceptible of considerable modification, and I do not wish to be limited to the construction herein described. For instance, instead of the float carrying a washing device it may carry a brush arranged to bear against the stone. So, also, the form of the tank and of the stone, the material of the filtering medium, and the relative location of the several parts may be changed at will. Instead of the arrangement of the filter-tank and the valve-controller shown in Fig. 1 it is obvious that they may be separated and each located wherever desired. Obviously, also, instead of the automatic valve-controller a positively-acting valve may be inserted in the flushing-pipe and the washing device will operate upon its manipulation, as hereinbefore described. Obviously, also, the main supply of water might come through a separate pipe and might be cut off during the flushing operation; but this arrangement is not very satisfactory in practice.

What I claim is—

1. A filter having a vertically-arranged filtering medium, a float in the filtering-chamber, means for cleansing said filtering medium mounted on said float and means for feeding and exhausting said filtering-chamber, substantially as and for the purpose set forth.

2. A filter having a vertically-arranged filtering medium, a float in the filtering-chamber, a washing device mounted on said float and means for feeding and exhausting said filtering-chamber.

3. A filter having a vertically-arranged filtering medium, a float in the filtering-chamber, a perforated pipe on said float, a supply-pipe, a flexible tube connecting said pipes, a flushing-pipe connected to the bottom of said filtering-chamber and means for opening and closing said flushing-pipe, substantially as and for the purpose set forth.

4. A filter having a vertically-arranged filtering medium, a float in the filtering-chamber, a perforated pipe on said float, a supply-pipe, a flexible tube connecting said pipes, a flushing-pipe connected to the bottom of said chamber and automatically-acting means for exhausting said filtering-chamber substantially as and for the purpose described.

5. A filter consisting of a tank, a hollow porous stone arranged vertically inside thereof, an annular float encircling said stone, an annular pipe on said float perforated along its inner side, a water-supply pipe, a flexible tube connecting said pipes, an outlet-pipe communicating with the interior of said stone, a flushing-pipe connected to the lower portion of said tank and valves in said pipes, substantially as and for the purpose set forth.

6. A filter consisting of a tank, a hollow porous stone arranged vertically inside thereof, an annular float encircling said stone, an annular pipe on said float perforated along its inner side, a water-supply pipe, a flexible tube connecting said pipes, an outlet-pipe communicating with the interior of said stone, a flushing-pipe connected to the lower portion of said tank and valves in said pipes and an automatic air-vent valve in the upper part of said tank.

7. An air-vent valve consisting of a conical seat and a buoyant perforated disk confined below said seat and having a hemispherical piece of soft rubber thereon, substantially as and for the purpose set forth.

8. In a filter, a tank having a pipe depending from the top thereof and terminating in a cage whose upper inner surface is conical, a perforated float in said cage and a hemispherical piece of soft rubber mounted on said float, substantially as and for the purpose set forth.

9. A valve-controller comprising a tank, having a snap-action spring device in its upper portion, a rod attached to said device and having a lost-motion connection to the stem of the valve to be operated, a float in said tank arranged to bear against tappets above and below it on said rod, and means for regulating the height of water in said tank, substantially as and for the purpose set forth.

10. A valve-controller comprising a tank, a stiff plate arranged horizontally in its upper portion and having upturned ends between which is clamped endwise a spring-piece, a vertical rod attached to said spring and having tappets thereon and having a pin-and-slot connection to the valve-stem, a float in said tank between said tappets, a device for holding said valve-stem in its raised position and means for regulating the height of water in said tank, substantially as and for the purpose set forth.

11. A filter comprising a tank, a filtering medium therein, a float in the filter-chamber, means for cleaning said filtering medium mounted on said float, a water-supply pipe communicating with the filtering-chamber, an outlet for the filtered water, a flushing-pipe connected to the bottom of the filter-chamber and to a second chamber having an outlet in its bottom and two openings in its top, a tank above said last-mentioned chamber, a valve for the lower opening having its stem projecting loosely through the one of the upper openings into the tank and the other opening communicating with said tank but having a valve operated by a float in said tank, a vertical rod in said tank connected at its lower end by a pin-and-slot connection to said valve-stem and at its upper end to a snap-action spring device, tappets on said rod and a float in said tank adapted to strike said tappets, and means for holding said valve-stem in its raised position, substantially as and for the purpose set forth.

WALTER H. WILCOX.

Witnesses:
JAMES A. CARR,
CHAS. E. WISE.